United States Patent
Olivas et al.

(10) Patent No.: US 9,759,327 B2
(45) Date of Patent: Sep. 12, 2017

(54) LARGE PERIMETER SEGMENTED SEALS

(71) Applicant: Parker-Hannifin Corporation, Cleveland, OH (US)

(72) Inventors: Marcos Olivas, Chula Vista, CA (US); Jay Jones, Chula Vista, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 15/088,462

(22) Filed: Apr. 1, 2016

(65) Prior Publication Data
US 2017/0051830 A1    Feb. 23, 2017

Related U.S. Application Data

(60) Provisional application No. 62/206,554, filed on Aug. 18, 2015.

(51) Int. Cl.
*F16J 15/02* (2006.01)
*F16J 15/06* (2006.01)

(52) U.S. Cl.
CPC ........... *F16J 15/022* (2013.01); *F16J 15/067* (2013.01)

(58) Field of Classification Search
CPC .. F16J 15/00; F16J 15/02; F16J 15/022; F16J 15/06; F16J 15/067; F16J 15/08; F16J 15/0818
See application file for complete search history.

(56) References Cited

U.S. PATENT DOCUMENTS

| | | | |
|---|---|---|---|
| 3,124,502 A * | 3/1964 | Radke | F16J 15/20 277/536 |
| 5,149,109 A | 9/1992 | Jelinek et al. | |
| 5,482,400 A * | 1/1996 | Bavington | E02D 29/12 404/25 |
| 5,906,377 A * | 5/1999 | Salameh | F16B 3/00 277/632 |
| 6,308,960 B1 * | 10/2001 | Peale | H04R 9/00 181/199 |

(Continued)

FOREIGN PATENT DOCUMENTS

| | | |
|---|---|---|
| CN | 204082029 U | 1/2015 |
| JP | H11141279 A | 4/1999 |

*Primary Examiner* — Gilbert Lee
(74) *Attorney, Agent, or Firm* — Renner, Otto, Boisselle & Sklar, LLP

(57) ABSTRACT

A segmented sealing assembly includes a first sealing segment and a second sealing segment, the first and second sealing segments having opposing mating components that are moved into a contact engagement to form the sealing assembly. The first and second sealing components include a first primary seal component on the first sealing component and a second primary seal component on the second sealing component that form a primary seal when the sealing segments are moved into the contact engagement. The sealing assembly includes compression elements on each of the first and second sealing segments. Compression of the compression elements exerts a force that moves the opposing mating components into the contact engagement. The mating components may be configured as tapered tongues having opposing slopes. A plurality of interlacing sealing beads may be provided on the tongues to provide a secondary seal within a gap between the tongues.

19 Claims, 5 Drawing Sheets

(56) References Cited

U.S. PATENT DOCUMENTS

| | | |
|---|---|---|
| 6,553,664 B1 | 4/2003 | Schenk |
| 7,147,774 B2 | 12/2006 | Jones, III |
| 8,348,280 B2 | 1/2013 | Pandey et al. |
| 2014/0319782 A1 | 10/2014 | Mohammad |

\* cited by examiner

LARGE PERIMETER SEGMENTED SEALS

RELATED APPLICATIONS

This application claims the benefit of U.S. Provisional Application No. 62/206,554 filed Aug. 18, 2015, which is incorporated herein by reference.

FIELD OF INVENTION

The present invention relates to sealing assemblies particularly suitable for sealing flanged hardware joints, and more particularly to segmented seals that may be employed for sealing large flanged hardware joints as may be present, for example, in large perimeter containers.

BACKGROUND OF THE INVENTION

The need for effective sealing of flanged hardware joints arises in many applications. An example of a typical flanged hardware joint is the junction between a container and a corresponding container lid. Another potential application may be the joining of relatively large tubular sections. The difficulty achieving an effective seal increases for large flanged hardware joints in which the joint components may have a significantly large perimeter. For example, in certain storage applications a container may be configured as a cylindrical container with a diameter of approximately seven to eight feet (or thereabout).

At such diameters (or more generally perimeters as comparable principles would apply to any shape container), it is difficult to achieve adequate sealing with a unitary sealing component. A unitary sealing component of such size may be subject to wear and cracking as it lacks stability and can be likely to move during use, and can be unwieldy to install.

One alternative to installing a unitary sealing component is to generate a substantially uniform sealing element using a sealing process known in the art as Room Temperature Vulcanization (RTV). In RTV sealing, a sealing material is initially applied to the flanged hardware joint in a high-viscous state by spraying, gunning (like a glue gun type application), or like application process. Due to the properties of the RTV material, the material cures over time in exposure to air to form a more solid-state elastomeric seal. Although RTV sealing can provide an effective seal, the process has several drawbacks. RTV sealing can be messy, and the RTV materials may be volatile in the application state requiring protective measures to prevent inhalation by users or combustion. In addition, the RTV material is not reusable rendering the container difficult to maintain. Accordingly, should the need arise to open and re-close a container sealed with RTV, the old RTV material must be scraped away and the RTV process must be performed again in its entirety to close and re-seal the container.

Another option for sealing large flanged hardware joints has been to provide segmented sealing assemblies rather than a unitary sealing component. With dividing the overall sealing structure into segments, each sealing segment is easier to install, and each segment tends to be more stable than a unitary sealing component, reducing movement and associated wear. The boundaries between the segments, however, result in gaps that constitute locations of potential leakage. In conventional configurations, the gaps often are sealed using RTV sealing. Although the amount of RTV sealing is reduced for segmented sealing assemblies as compared to using RTV sealing alone, any use of RTV still suffers to a significant degree from the drawbacks referenced above.

SUMMARY OF THE INVENTION

The present invention provides an enhanced segmented sealing assembly for a large perimeter flanged hardware joint, that provides an effective seal without using RTV sealing at the gaps between the sealing segments. The segmented sealing assembly combines a plurality of sealing segments to form the overall sealing assembly. Such a segmented sealing assembly may seal any first or interior area bounded by the sealing assembly from a second or exterior area, and is assembled from two or more of the sealing segments to create the single sealing assembly.

Each sealing segment may include a rigid retainer element (e.g., a metal, reinforced plastic, composite or other suitable retainer material), over-molded with a resilient element. The resilient element may include multiple compression elements which are compressed in use to close gaps at the boundaries between adjacent sealing segments to enhance the effectiveness of the sealing assembly, and to provide additional secondary sealing functions. The resilient element may be over-molded on or otherwise chemically bonded to the retainer element to prevent movement or extrusion away from the retainer material when subjected to heavy clamping pressure from joining the members of the flanged hardware joint being sealed.

The resilient elements of two adjacent sealing segments may include opposing tapered tongues which are oppositely sloped and come together in a contact engagement at the boundary of such adjacent segments. In use, the clamping pressure of the members of the flanged hardware joints compresses the multiple compression elements, which forces the opposing tongues together to close the gaps between the sealing segments. Some of the compression elements are configured as sealing beads on the opposing tongues, which interlace to provide an additional secondary sealing function across the gaps between the adjacent sealing segments. The configuration of the segmented sealing assembly of the present invention provides effective sealing for large perimeter flanged hardware joints, without the need to apply RTV sealing, or other secondary sealing elements or processes, at the boundaries between adjacent sealing segments.

An aspect of the invention, therefore, is a segmented sealing assembly. In exemplary embodiments, the segmented sealing assembly includes a first sealing segment and a second sealing segment, the first and second sealing segments having opposing mating components that are moved into a contact engagement to form the sealing assembly. The first and second sealing components include a first primary seal component on the first sealing component and a second primary seal component on the second sealing component that form a primary seal when the sealing segments are moved into the contact engagement. The sealing assembly includes compression elements on each of the first and second sealing segments. Compression of the compression elements exerts a force that moves the opposing mating components into the contact engagement, which provides an enhanced closure of the gap between the two sealing segments. The opposing mating components may be configured as tapered tongues having opposing slopes that come together in the contact engagement. A plurality of interlacing sealing beads may be provided on the tongues to provide a secondary seal within a gap between the tongues.

An overall sealing assembly may be formed with alternating first and second sealing segments configured to form a closed perimeter sealing assembly. For example, the closed perimeter sealing assembly may be a closed circular ring sealing assembly, although any shape may be employed. The sealing assembly may be incorporated into a flanged hardware joint including a first joint component and a second joint component. The sealing assembly is located between the first joint component and the second joint component to seal the flanged hardware joint. A plurality of fastening elements may secure the first joint component to the second joint component. Tightening the fastening elements compresses the compression elements to exert the force that moves the opposing mating components into the contact engagement. In an example usage, the first joint component may be a container body and the second joint component may be a container lid.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
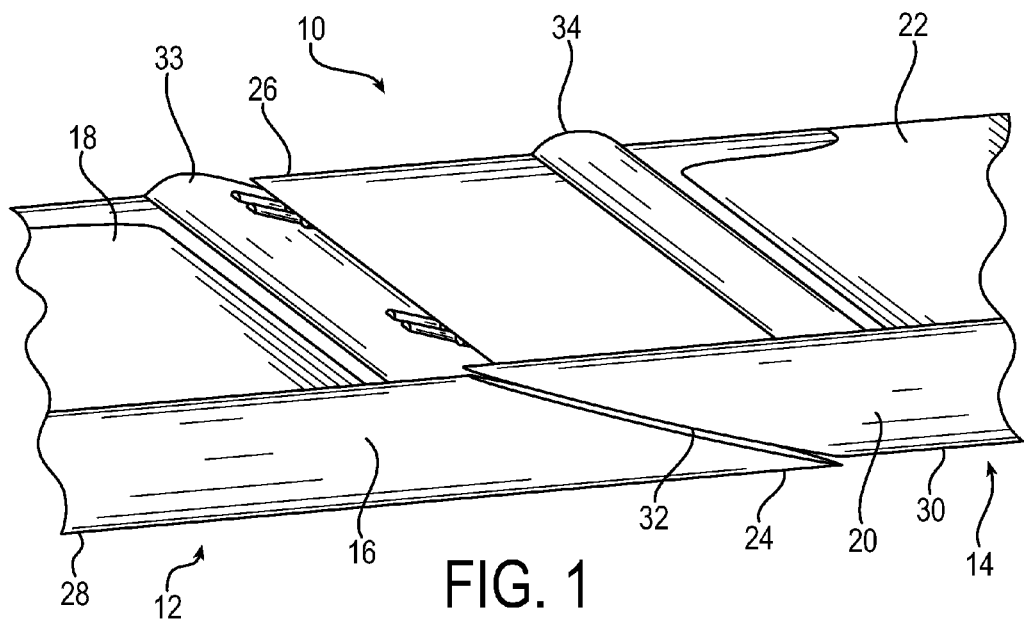
FIG. 1 is a drawing depicting an exemplary portion of a segmented sealing assembly in accordance with embodiments of the present invention.

Embodiments of the present invention will now be described with reference to the drawings, wherein like reference numerals are used to refer to like elements throughout. It will be understood that the figures are not necessarily to scale.

The present invention is directed toward a segmented sealing assembly. In general, in exemplary embodiments the sealing assembly includes a first sealing segment and a second sealing segment, the first and second sealing segments having opposing mating components that are moved into a contact engagement to form the sealing assembly. The first and second sealing components include a first primary seal component on the first sealing component and a second primary seal component on the second sealing component, wherein the first and second primary seal components form a primary seal when the first and second sealing segments are moved into the contact engagement. The sealing assembly further includes at least one compression element on each of the first and second sealing segments, wherein compression of the compression elements exerts a force that moves the opposing mating components into the contact engagement.

Figure 2:
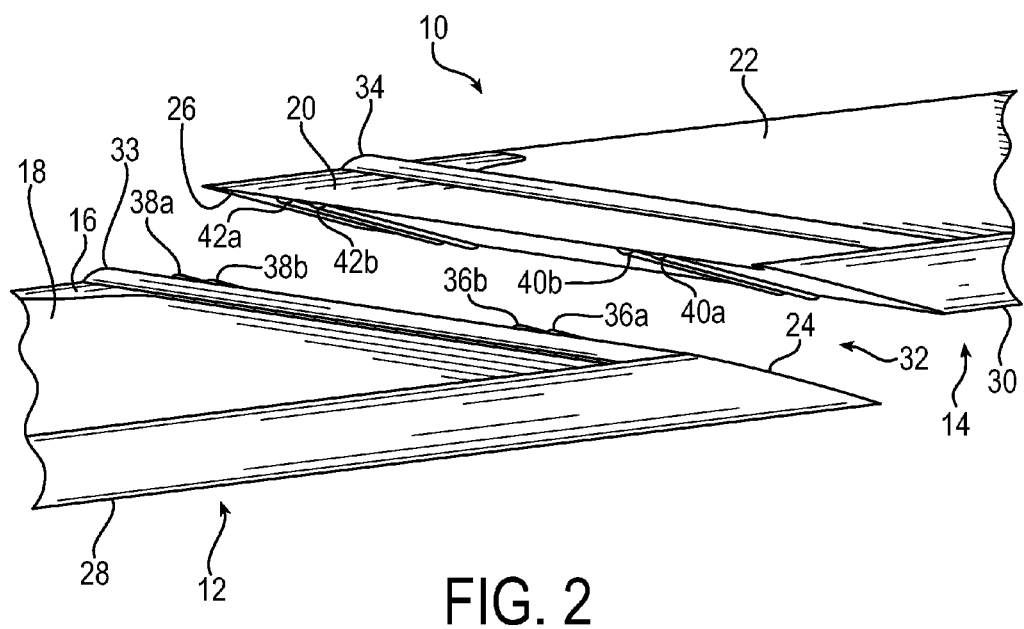
FIG. 2 is a drawing depicting the exemplary portion of the segmented sealing assembly of FIG. 1, with the two sealing segments separated.

FIG. 1 is a drawing depicting an exemplary portion of a segmented sealing assembly 10 in accordance with embodiments of the present invention, including a first sealing segment 12 and a second sealing segment 14. FIG. 2 is a drawing depicting the exemplary portion of the segmented assembly 10 of FIG. 1, with the two sealing segments 12 and 14 being separated for a clearer view of certain features. First sealing segment 12 includes a resilient member 16 and a rigid retainer element 18. Similarly, second sealing segment 14 includes a resilient member 20 and a rigid retainer element 22.

The resilient members 16 and 20 may be composed of any suitable elastomeric or other rubber-like compressible material, as are known in art as being suitable for sealing flanged hardware joints. The resilient members may be over-molded around the retainer elements, or otherwise chemically bonded or adhered to the retainer elements by any suitable processes.

The retainer elements 18 and 22 may be composed of a rigid or semi-rigid material to provide backing and support for the resilient members. For example, the retainer elements may be metal retainers that constitute backing elements to the resilient members for enhanced stiffness and stability of the seal. The retainer elements thus prevent significant extrusion of the resilient members along the flanged hardware joint. In addition, the rigid nature of the metal retainers distributes the load of clamping of the two components of the flanged hardware joint (e.g., clamping a container lid onto a container body) without crushing the resilient members. Suitable reinforced plastics, composites or other suitable rigid materials may be employed in forming the retainers, provided the retainers are strong enough to withstand the clamping loads without cracking for a given application.

The resilient members of the sealing segments include opposing mating components that are moved into a contact engagement to form the seal assembly. In exemplary embodiments, the mating components are configured as a first tapered tongue on the first sealing segment and a second tapered tongue on the second sealing segment. Slopes of the first and second tapered tongues are opposing slopes that are moved together into the contact engagement.

As seen in FIGS. 1 and 2, an end of the first sealing segment 12 is configured to have a first tapered tongue 24. By "tongue", such term is intended to denote that the end is tapered or slopes in a wedge shape. Defining the longitudinal direction as the long direction of the sealing segment, and the transverse direction as the short direction perpendicular to the longitudinal direction, the slope of the tongue is oriented in the longitudinal direction. Accordingly, the first tongue 24 slopes longitudinally outward from an upper transverse side down to the lower transverse side at the longitudinal tip of the first tongue. In addition, an end of the second sealing segment 14 is configured to have a second tapered tongue 26, which slopes oppositely relative to the first tongue 24. In other words, the wedge shape of the second tongue slopes longitudinally inward from an upper transverse at the longitudinal tip of the second tongue down to the lower transverse side. In this manner, the slopes of the two tapered tongues can be brought together in a contract engagement as seen in a progression from FIG. 2 to FIG. 1, such that the overall transverse thickness of the sealing assembly 10 remains essentially constant.

In one embodiment, the first sealing segment 12 may have two ends configured as the first tongue 24, and the second sealing segment 14 may have two ends configured as the second tongue 26. To achieve the configuration of FIG. 1 around an entire sealing perimeter, therefore, first sealing segments would be alternated with second sealing segments along the entire span of the perimeter of the sealing assembly. Alternatively, each sealing segment may be configured comparably having a first end configured as the first tongue, and a second end configured as the second tongue. The sealing segments are then brought together in a contact engagement alternating with a first end joining a second end at each boundary of two segments.

The sealing assembly is configured to have a primary seal on an inner perimeter of the sealing assembly. In the example of a generally circular flanged hardware joint, such as in the case of a cylindrical container, the primary seal is provided on the inner diameter of the sealing assembly.

Referring again to FIGS. 1 and 2, first sealing segment 12 has a first primary seal component 28 located on the inner perimeter of the first sealing segment, and second sealing segment 14 has a second primary seal component 30 located on the inner perimeter of the second sealing segment. The primary seal components 28 and 30 may have a greater thickness as compared to a thickness at an outer perimeter of the sealing segments. In this manner, when the sealing segments are compressed during installation, the material of the primary seal component expands into any space defined by the flanged hardware joint to form a complete seal. By being provided on the inner perimeter of the sealing assembly, the primary seal components provide an initial and primary retention of any contents interior to the sealing assembly from the exterior of the sealing assembly. The first primary seal component 28 and second primary seal component 30 extend the entire longitudinal expanse of the respective sealing segments, including extending respectively along the first and second tapered tongues 24 and 26. Accordingly, the longitudinal ends of the primary seal components 28 and 30 are tapered or sloped commensurately as described above generally with respect to the tongues, so that the wedge or sloped portions of opposing primary seal components come together in a contact engagement to form a complete primary seal. In other words, the slopes of the first and second primary seal components also are opposing slopes that are moved together into the contact engagement to form the primary seal.

As referenced in the background, one concern associated with segmented sealing assemblies is the presence of a gap at the boundary between adjacent sealing segments. Such a gap 32, for example, is illustrated in FIGS. 1 and 2. To close the gap to create a tight contact engagement, and to enhance the efficacy of the overall sealing assembly without the use of RTV or other conventional secondary processing, the sealing assembly of the present invention has a plurality of compression elements, which may include at least one compression element on each of the first and second sealing segments. As described in more detail below, compression of the compression elements exerts a force that moves the opposing mating components (i.e., the opposing tongues) into the contact engagement.

The plurality of compression elements may include at least one energizing lobe provided on each of the sealing segments. In the example of FIGS. 1 and 2, first sealing segment 12 has a first energizing lobe 33, and second sealing segment 14 has a second energizing lobe 34. The energizing lobes 33 and 34 are configured to have a greater thickness as compared to a thickness of sealing segments defined by the retainer elements, and may be positioned at or adjacent to a base of the respective tapered tongues 24 and 26 (i.e., from where the wedge shape begins to taper from the respective sealing segments). In the example of FIGS. 1 and 2, the first energizing lobe 33 extends transversely across the first sealing segment 12 from the first primary seal component 28 to an outer perimeter of the first sealing segment, and similarly the second energizing lobe 34 extends transversely across second sealing segment 14 from the second primary seal component 30 to an outer perimeter of the second sealing segment. Transverse compression of the energizing lobes during installation exerts a longitudinal force in the surrounding resilient material to move the opposing mating components longitudinally into the contact engagement. The result of such longitudinal expansion is that the opposing tongues are forced together at the opposing slopes to provide a tight contact engagement, with enhanced closure of the gap 32.

The opposing mating components, tongues 24 and 26, further may include a plurality of sealing beads provided on each of the sealing segments, particularly located on and extending longitudinally along the slopes of the tongues 24 and 26. In general, when the opposing mating components are in the contact engagement, the plurality of sealing beads form a secondary seal between the first and second opposing mating components in a transverse direction across the gap 32.

In the example of FIGS. 1 and 2 (and see particularly FIG. 2), a portion of the plurality of sealing beads are provided on the first sealing segment 12 as a first pair of sealing beads 36*a* and 36*b* and a second pair of sealing beads 38*a* and 38*b*. Similarly, another portion of the plurality of sealing beads are provided on the second sealing segment 14 as a third pair of sealing beads 40*a* and 40*b* and a fourth pair of sealing beads 42*a* and 42*b*. When the sealing segments are compressed transversely during installation, the contact engagement of the opposing tongues results in the sealing beads being compressed, with the first portion of the sealing beads (first sealing segment) being interlaced with the another portion of the sealing beads (second sealing segment) across the gap 32. The sealing beads, therefore, form a secondary seal that precludes migration of contents from the inner perimeter of the sealing assembly, across the gap 32 to the outer perimeter of the sealing assembly (and vice versa).

Figure 3:
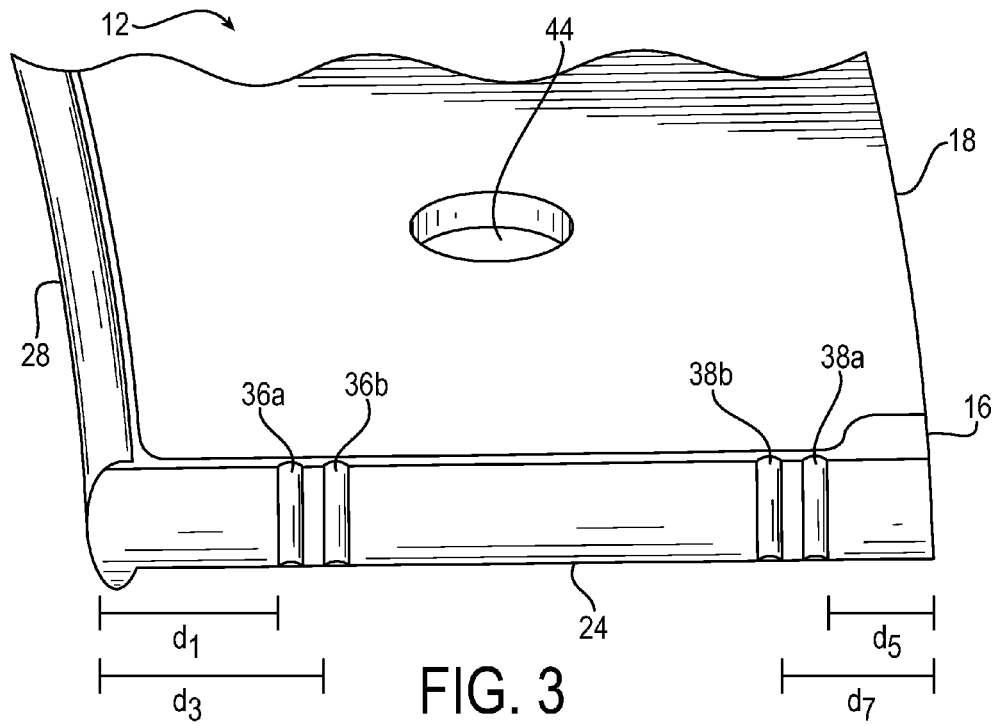
FIG. 3 is a drawing depicting a top view of an exemplary first sealing segment for use in the exemplary portion of the segmented sealing assembly of FIGS. 1 and 2.
Figure 4:
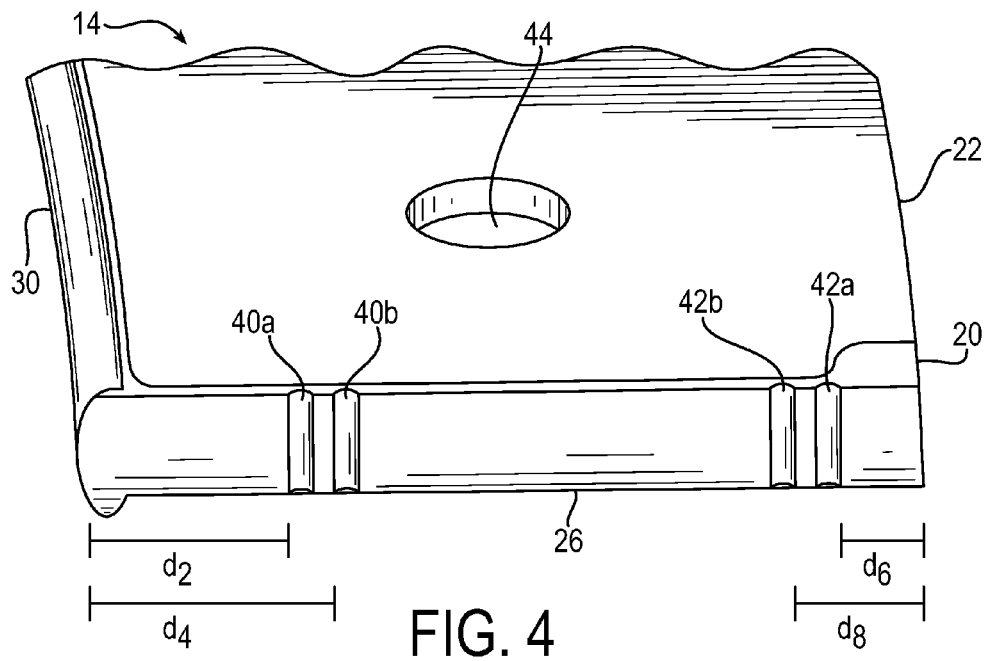
FIG. 4 is a drawing depicting a bottom view of an exemplary second sealing segment for use in the exemplary portion of the segmented sealing assembly of FIGS. 1 and 2.

FIGS. 3 and 4 illustrate additional details of the configuration of the sealing beads, and more specifically illustrate how the sealing beads interlace and mesh to enhance their secondary sealing function. FIG. 3 is a drawing depicting a top view of the first sealing segment 12, and FIG. 4 is a drawing depicting a bottom view of the second sealing segment 14. In other words, since the second sealing segment 14 faces downward in FIGS. 1 and 2, FIG. 4 essentially provides a "flipped" view so that the underside of the second tongue 26 is more readily visible. A comparison of FIGS. 3 and 4 illustrates certain similarities of the two sealing segments as described above. In addition, FIGS. 3 and 4 further illustrate that the sealing segments may be provided with fastening holes 44 through which fastening elements (e.g., bolts) may extend to secure the components of the flanged hardware joint together. As a structural difference, the positioning of the various sealing beads differs in the first sealing segment 12 as compared to the second sealing segment 14.

Referring to FIG. 3, using the inner perimeter of the sealing segment as a reference point, sealing bead 36a is a distance d1 from the inner perimeter and sealing bead 36b is a distance d3 from the inner perimeter. Referring to FIG. 4, again using the inner perimeter of the sealing segment as a reference point, sealing bead 40a is a distance d2 from the inner perimeter and sealing bead 40b is a distance d4 from the inner perimeter. The referenced distances have the relationship d1<d2<d3<d4. Similarly, referring to FIG. 3, using the outer perimeter of the sealing segment as a reference point, sealing bead 38a is a distance d5 from the outer perimeter and sealing bead 38b is a distance d7 from the outer perimeter. Referring to FIG. 4, again using the outer perimeter of the sealing segment as a reference point, sealing bead 42a is a distance d6 from the inner perimeter and sealing bead 42b is a distance d8 from the inner perimeter. The referenced distances have the relationship d5<d6<d7<d8. With such configuration, when the sealing assembly is compressed and the opposing tongues 24 and 26 are forced together into the contact engagement, the sealing beads mesh or interlace to form two sets of four interlaced sealing beads, the two sets of sealing beads being spaced apart from each other. This provides for enhanced secondary sealing transversely across the gap 32.

Variations in the distances can result in different interlaced configurations. For example, the sealing bead pairs may be equidistant from the respective inner or outer perimeters of the sealing segments (e.g., d1=d5, d2=d6, d3=d7, and d4=d8), but this need not be the case. Other interlacing arrangements of different proximity to the edge may be employed, such as for example where d6<d5<d8<d7. In addition, the figures depict the sealing beads as being essentially the same size, but the sizes may be varied while still achieving an interlaced configuration. In addition, the figures depict the individual sealing beads being spaced apart equidistantly from each other in each sealing bead pair, but this also may be varied while still achieving an interlaced configuration.

The configuration of the present invention, therefore, provides enhanced sealing as compared to conventional segmented seal configurations, and without the use of RTV or like processes. The abutting surfaces of the resilient members 20 and 22 at the tapered tongues 24 and 26, combined with the additional enhancements of the energizing lobes 33 and 34 and sealing beads 36-42, result in alignment and gap sealing that facilitates assembly and results in improved sealing efficacy. The tapered mating of the resilient tongues enables adjacent surfaces of the sealing components to be readily brought into initial contact engagement. As the sealing segments are aligned and secured in the flanged hardware joint, a solid abutting fit between the adjacent segments and resilient elements is formed. This configuration of the present invention is particularly suitable for very large ports or openings (e.g., several feet in perimeter or diameter) requiring a sealing element, for static face sealing for low pressure applications. This configuration further eliminates the traditional need to apply RTV sealing at boundaries between adjacent sealing segments at their location of contact engagement.

An overall sealing assembly may be formed by alternating first and second sealing segments in a manner configured to form a closed perimeter sealing assembly. For example, the closed perimeter sealing assembly may be a closed circular ring sealing assembly. Accordingly, a flanged hardware joint may include a first joint component and a second joint component. The sealing assembly may be located between the first joint component and the second joint component to seal a junction between the first joint component and the second joint component. The flanged hardware joint further may include a plurality of fastening elements that secure the first joint component to the second joint component. Tightening the fastening elements compresses the compression elements on each of the first and second sealing segments to exert the force that moves the opposing mating components into the contact engagement.

FIGS. 5-9 describe an exemplary usage of the sealing assembly 10 of the present invention, in connection with the sealing of a cylindrical container. It will be appreciated, however, that the use of the present invention is not limited to this example, but comparable principles may be applied to the sealing of any large-perimeter flanged hardware joint.

Figure 5:
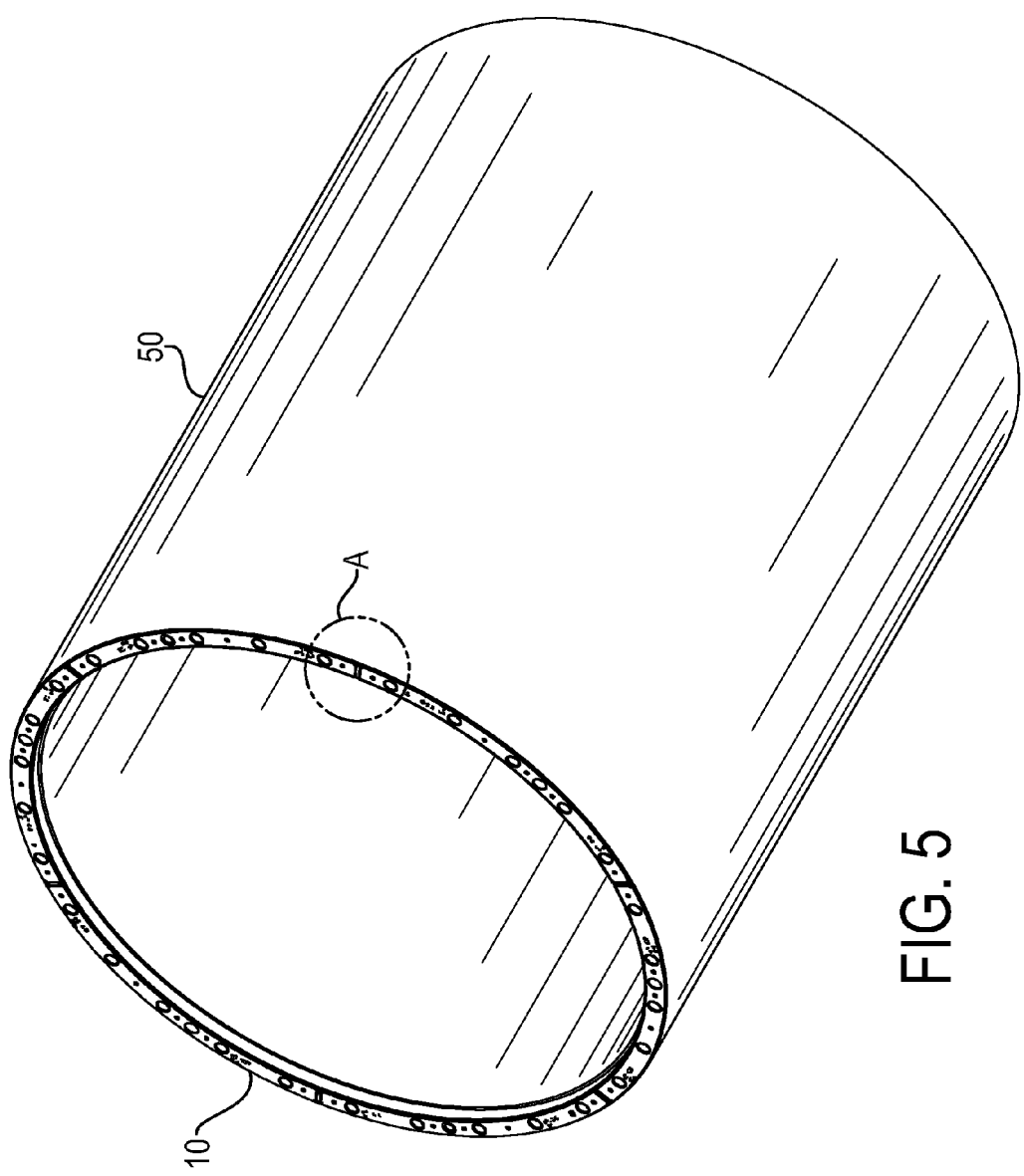
FIG. 5 is a drawing depicting an exemplary container body with an installed segmented sealing assembly in accordance with embodiments of the present invention.
Figure 6:
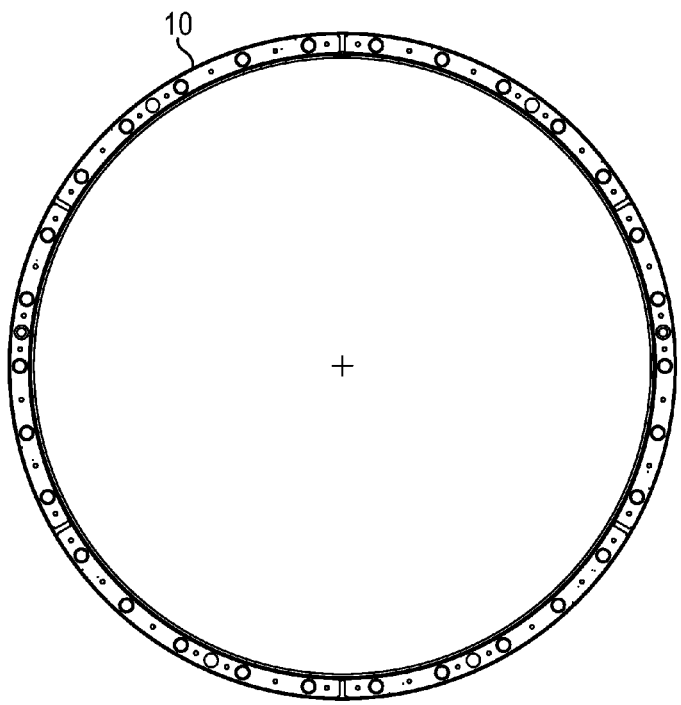
FIG. 6 is a drawing depicting a top view of the container body with the installed sealing assembly of FIG. 5.
Figure 7:
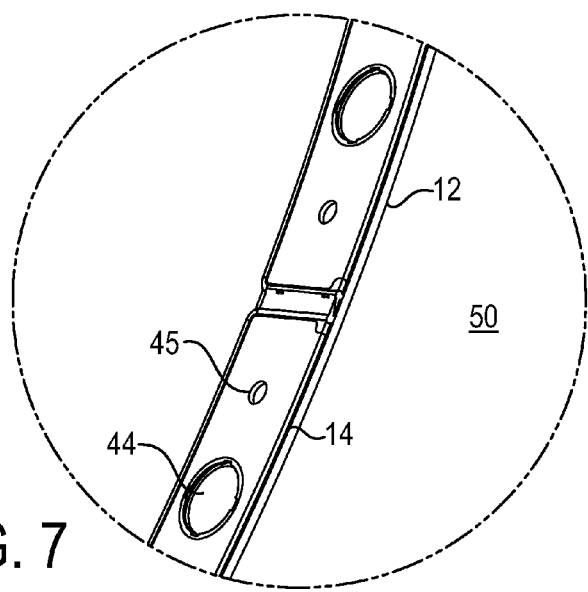
FIG. 7 is a drawing depicting the detail A as identified in FIG. 5.

FIG. 5 is a drawing depicting an exemplary container body 50, an end or rim of which may constitute a first joint component of a flanged hardware joint to be sealed. In FIG. 5, the sealing assembly 10 in accordance with embodiments of the present invention has been installed along the rim or end of the container body 50. FIG. 6 is a drawing depicting a top view of the container body 50 with the installed seal assembly 10 of FIG. 5, and FIG. 7 is a drawing depicting the detail A as identified in FIG. 5.

As seen in FIG. 6, which as a top view essentially shows only the sealing assembly, the sealing assembly 10 includes alternating sealing segments to form an overall sealing assembly with a closed perimeter configuration. In other words, the sealing assembly 10 extends entirely around the perimeter of the container body in a segmented fashion to form a closed ring. FIG. 7 shows a junction where a first sealing segment 12 is joined with a second sealing segment 14. The fastening holes 44 from FIGS. 3 and 4 also are shown. In addition, the sealing segments further may include alignment holes 45 that constitute visual alignment indicators for initial positioning of the sealing segments relative to the end of the container body 50 during installation.

Figure 8:
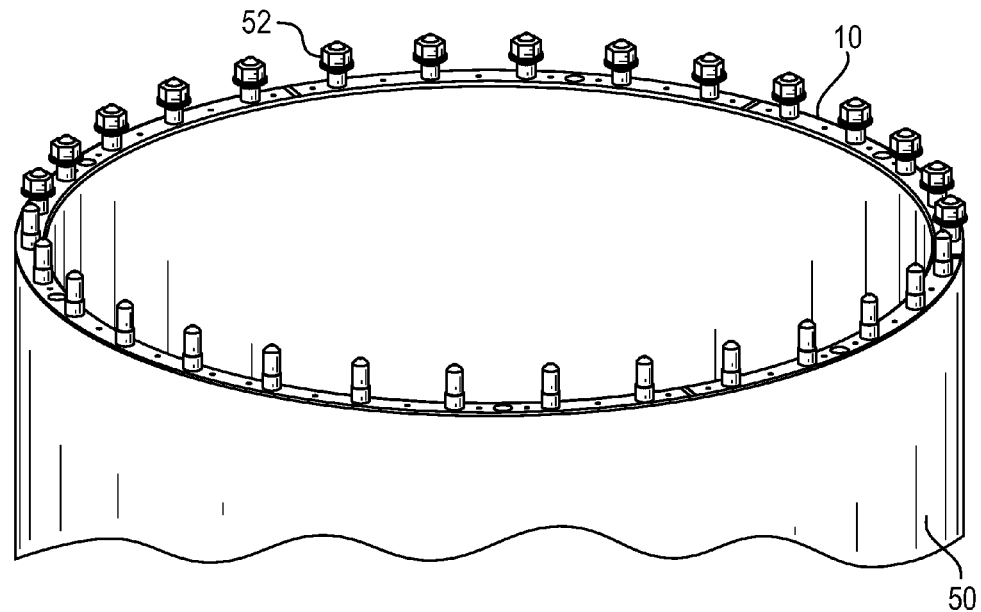
FIG. 8 is a drawing depicting an isometric view of the exemplary container body with installed sealing assembly of FIG. 5, showing additionally fastening elements.

FIG. 8 is a drawing depicting an isometric view of the exemplary container body 50 with installed sealing assembly 10 of FIG. 5, showing additionally fastening elements 52 that are used to secured the two components of the flanged hardware joint together. In the example of FIG. 8, the fastening elements are configured as nut/bolt fasteners, although any suitable fastening elements may be employed. The bolt portions of the fasteners are secured to the container body 50 by threading or any suitable means, and extend through the fastener holes in the sealing assembly. Nut portions are shown in FIG. 8 as they may be secured to the bolts, but the nuts of course in practice are secured only after positioning of the container lid, an end of which constitutes the second joint component of the flanged hardware joint.

Figure 9:
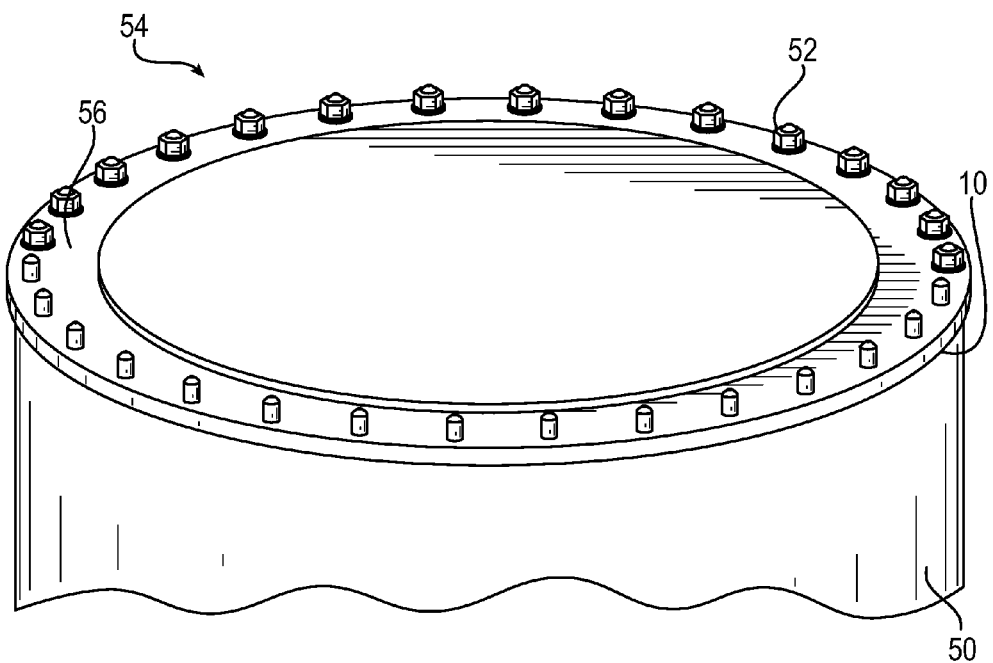
FIG. 9 is a drawing depicting an exemplary container that employs the sealing assembly in accordance with embodiments of the present invention.

FIG. 9, therefore, is a drawing depicting an exemplary container 54 that employs the sealing assembly 10 in accordance with embodiments of the present invention. The container 54 includes the container body 50 as the first joint component, and an additional container lid 56 constituting the second joint component that, in combination with the container body, defines the flanged hardware joint. The sealing assembly 10 seals the flanged hardware joint between the container body 50 and the container lid 56.

As the fastening elements 52 are tightened, the sealing assembly is compressed transversely between the container body 50 and the container lid 56. As described above, as a result of such compression: (1) the primary seal components 28 and 30 are compressed and expand to provide the primary seal along the inner perimeter of the flanged hardware joint; (2) the opposing mating components, tapered tongues 24 and 26, of adjacent sealing segments are forced longitudinally together into a tight contact engagement by the transverse compression of the energizing lobes 33 and 34; and (3) the various sealing beads 36-42 mesh in an interlaced configuration to provide a secondary seal within the gap 32.

An aspect of the invention, therefore, is a segmented sealing assembly. In exemplary embodiments, the segmented sealing assembly may include a first sealing segment and a second sealing segment, the first and second sealing segments having opposing mating components that are moved into a contact engagement to form the sealing assembly. The first and second sealing components include: a first primary seal component on the first sealing component and a second primary seal component on the second sealing component, wherein the first and second primary seal components form a primary seal when the first and second sealing segments are moved into the contact engagement; and at least one compression element on each of the first and second sealing segments, wherein compression of the compression elements exerts a force that moves the opposing mating components into the contact engagement. Embodiments of the segmented sealing assembly may include one or more of the following features, either individually or in combination.

In an exemplary embodiment of the segmented sealing assembly, the opposing mating components include a first tapered tongue on the first sealing segment and a second tapered tongue on the second sealing segment. Slopes of the first and second tapered tongues are opposing slopes that are moved together into the contact engagement.

In an exemplary embodiment of the segmented sealing assembly, the first primary seal component is located on an inner perimeter of the first sealing segment and the second primary seal component is located on an inner perimeter of the second sealing segment. A thickness of the primary sealing components is greater than a thickness of an outer perimeter of the sealing segments.

In an exemplary embodiment of the segmented sealing assembly, the first primary seal component extends along the first tongue, and the second primary seal component extends along the second tongue. The first and second seal components are sloped commensurately with the first and second tongues such that the slopes of the first and second primary seal components are opposing slopes that are moved together into the contact engagement to form the primary seal.

In an exemplary embodiment of the segmented sealing assembly, the at least one compression element on each of the first and second sealing segments comprises a first energizing lobe on the first sealing segment and a second energizing lobe on the second sealing segment.

In an exemplary embodiment of the segmented sealing assembly, the first energizing lobe extends transversely across the first sealing segment from the first primary seal component to an outer perimeter of the first sealing segment, and the second energizing lobe extends transversely across second sealing segment from the second primary seal component to an outer perimeter of the second sealing segment. Compression of the energizing lobes exerts a longitudinal force to move the opposing mating components longitudinally into the contact engagement.

In an exemplary embodiment of the segmented sealing assembly, the opposing mating components include a plurality of sealing beads, and when the opposing mating components are in the contact engagement, the plurality of sealing beads form a secondary seal between the first and second opposing mating components.

In an exemplary embodiment of the segmented sealing assembly, a portion of the plurality of sealing beads are on the mating component of the first sealing segment, and another portion of the plurality of sealing beads are on the mating component of the second sealing segment. When the opposing mating components are in the contact engagement, the portion of the sealing beads on the first sealing segment are interlaced with the another portion of the sealing beads on the second sealing segment.

In an exemplary embodiment of the segmented sealing assembly, the portion of the plurality of sealing beads on the mating component of the first sealing segment comprises two pair of spaced apart sealing beads; and the another portion of the plurality of sealing beads on the mating component of the second sealing segment comprises two pair of spaced apart sealing beads. When the opposing mating components are in the contact engagement, the sealing beads are in an interlaced configuration comprising two sets of four interlaced sealing beads, the two sets of interlaced sealing beads being spaced apart from each other.

In an exemplary embodiment of the segmented sealing assembly, the opposing mating components comprise a first tapered tongue on the first sealing segment and a second tapered tongue on the second sealing segment, wherein slopes of the first and second tapered tongues are opposing slopes that are moved together into the contact engagement. The plurality of sealing beads are located on the slope of at least one of the tapered tongues.

In an exemplary embodiment of the segmented sealing assembly, the plurality of sealing beads extend longitudinally along the slope of at least one of the tapered tongues.

In an exemplary embodiment of the segmented sealing assembly, each sealing segment comprises a rigid retainer element, and a resilient member bonded to the retainer element, and the resilient members include the opposing mating components.

In an exemplary embodiment of the segmented sealing assembly, the resilient members are over-molded onto the retainer elements.

Another aspect of the invention is a sealing assembly comprising alternating first and second sealing segments according to any of the embodiments, wherein the alternating first and second sealing components are configured to form a closed perimeter sealing assembly. In an exemplary embodiment of the sealing assembly, the closed perimeter sealing assembly is a closed circular ring sealing assembly.

Another aspect of the invention is a flanged hardware joint. In exemplary embodiments, the flanged hardware joint includes a first joint component and a second joint component; and the sealing assembly of any of the embodiments located between the first joint component and the second joint component to seal a junction between the first joint component and the second joint component. Embodiments of the flanged hardware joint may include one or more of the following features, either individually or in combination.

In an exemplary embodiment of the flanged hardware joint, the joint may include a plurality of fastening elements that secure the first joint component to the second joint component. Tightening the fastening elements compresses the at least one compression element on each of the first and second sealing segments to exert the force that moves the opposing mating components into the contact engagement.

In an exemplary embodiment of the flanged hardware joint, the first joint component is a container body and the second joint component is a container lid.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A segmented sealing assembly comprising:
a first sealing segment and a second sealing segment, the first and second sealing segments having opposing mating components that are moved into a contact engagement to form the sealing assembly;
the first and second sealing components comprising:
a first primary seal component on the first sealing component and a second primary seal component on the second sealing component, wherein the first and second primary seal components form a primary seal when the first and second sealing segments are moved into the contact engagement; and
at least one compression element on each of the first and second sealing segments, wherein compression of the compression elements exerts a force that moves the opposing mating components into the contact engagement;
wherein the first primary seal component is located on an inner perimeter of the first sealing segment and the second primary seal component is located on an inner perimeter of the second sealing segment; and
a thickness of the primary sealing components is greater than a thickness of an outer perimeter of the sealing segments.

2. The segmented sealing assembly of claim 1, wherein the opposing mating components comprise:
a first tapered tongue on the first sealing segment and a second tapered tongue on the second sealing segment;
wherein slopes of the first and second tapered tongues are opposing slopes that are moved together into the contact engagement.

3. The segmented sealing assembly of claim 2, wherein the first primary seal component extends along the first tongue, and the second primary seal component extends along the second tongue; and
the first and second seal components are sloped commensurately with the first and second tongues such that the slopes of the first and second primary seal components are opposing slopes that are moved together into the contact engagement to form the primary seal.

4. The sealing assembly of claim 1, wherein each sealing segment comprises a rigid retainer element, and a resilient member bonded to the retainer element, and the resilient members include the opposing mating components.

5. The sealing assembly of claim 4, wherein the resilient members are over-molded onto the retainer elements.

6. A sealing assembly comprising alternating first and second sealing segments according to claim 1, wherein the alternating first and second sealing components are configured to form a closed perimeter sealing assembly.

7. The sealing assembly of claim 6, wherein the closed perimeter sealing assembly is a closed circular ring sealing assembly.

8. A segmented sealing assembly comprising:
a first sealing segment and a second sealing segment, the first and second sealing segments having opposing mating components that are moved into a contact engagement to form the sealing assembly;
the first and second sealing components comprising:
a first primary seal component on the first sealing component and a second primary seal component on the second sealing component, wherein the first and second primary seal components form a primary seal when the first and second sealing segments are moved into the contact engagement; and
at least one compression element on each of the first and second sealing segments, wherein compression of the compression elements exerts a force that moves the opposing mating components into the contact engagement,
wherein the at least one compression element on each of the first and second sealing segments comprises a first energizing lobe on the first sealing segment and a second energizing lobe on the second sealing segment.

9. The segmented sealing assembly of claim 8, wherein:
the first energizing lobe extends transversely across the first sealing segment from the first primary seal component to an outer perimeter of the first sealing segment; and
the second energizing lobe extends transversely across second sealing segment from the second primary seal component to an outer perimeter of the second sealing segment;
wherein compression of the energizing lobes exerts a longitudinal force to move the opposing mating components longitudinally into the contact engagement.

10. A segmented sealing assembly comprising:
a first sealing segment and a second sealing segment, the first and second sealing segments having opposing mating components that are moved into a contact engagement to form the sealing assembly;
the first and second sealing components comprising:
a first primary seal component on the first sealing component and a second primary seal component on the second sealing component, wherein the first and second primary seal components form a primary seal when the first and second sealing segments are moved into the contact engagement; and
at least one compression element on each of the first and second sealing segments, wherein compression of the compression elements exerts a force that moves the opposing mating components into the contact engagement,
wherein the opposing mating components include a plurality of sealing beads, and when the opposing mating components are in the contact engagement, the plurality of sealing beads form a secondary seal between the first and second opposing mating components.

11. The segmented sealing assembly of claim 10, wherein:
a portion of the plurality of sealing beads are on the mating component of the first sealing segment, and another portion of the plurality of sealing beads are on the mating component of the second sealing segment; and when the opposing mating components are in the contact engagement, the portion of the sealing beads on the first sealing segment are interlaced with the another portion of the sealing beads on the second sealing segment.

12. The segmented sealing assembly of claim 11, wherein:
the portion of the plurality of sealing beads on the mating component of the first sealing segment comprises two pair of spaced apart sealing beads;
the another portion of the plurality of sealing beads on the mating component of the second sealing segment comprises two pair of spaced apart sealing beads; and
when the opposing mating components are in the contact engagement, the sealing beads are in an interlaced configuration comprising two sets of four interlaced sealing beads, the two sets of interlaced sealing beads being spaced apart from each other.

13. The sealing assembly of claim 10, wherein:
the opposing mating components comprise a first tapered tongue on the first sealing segment and a second tapered tongue on the second sealing segment, wherein slopes of the first and second tapered tongues are opposing slopes that are moved together into the contact engagement; and
the plurality of sealing beads are located on the slope of at least one of the tapered tongues.

14. The sealing assembly of claim 13, wherein the plurality of sealing beads extend longitudinally along the slope of at least one of the tapered tongues.

15. A flanged hardware joint comprising;
a first joint component and a second joint component; and
the sealing assembly of claim 1 located between the first joint component and the second joint component to seal a junction between the first joint component and the second joint component.

16. The flanged hardware joint of claim 15, further comprising a plurality of fastening elements that secure the first joint component to the second joint component;
wherein tightening the fastening elements compresses the at least one compression element on each of the first and second sealing segments to exert the force that moves the opposing mating components into the contact engagement.

17. The flanged hardware joint of claim 16, wherein the first joint component is a container body and the second joint component is a container lid.

18. A flanged hardware joint comprising;
a first joint component and a second joint component; and
the sealing assembly of claim 8 located between the first joint component and the second joint component to seal a junction between the first joint component and the second joint component.

19. A flanged hardware joint comprising;
a first joint component and a second joint component; and
the sealing assembly of claim 10 located between the first joint component and the second joint component to seal a junction between the first joint component and the second joint component.

* * * * *